(12) United States Patent
Piet

(10) Patent No.: US 11,165,675 B1
(45) Date of Patent: Nov. 2, 2021

(54) SYSTEM AND METHOD FOR NETWORK TRAFFIC CLASSIFICATION USING SNIPPETS AND ON THE FLY BUILT CLASSIFIERS

(71) Applicant: Corelight, Inc., San Francisco, CA (US)

(72) Inventor: Julien Piet, San Francisco, CA (US)

(73) Assignee: Corelight, Inc., San Francisco, CA (US)

( * ) Notice: Subject to any disclaimer, the term of this patent is extended or adjusted under 35 U.S.C. 154(b) by 0 days.

(21) Appl. No.: 17/234,566

(22) Filed: Apr. 19, 2021

(51) Int. Cl.
*H04L 12/26* (2006.01)
*G06K 9/62* (2006.01)

(52) U.S. Cl.
CPC .......... *H04L 43/062* (2013.01); *G06K 9/6256* (2013.01); *G06K 9/6278* (2013.01); *H04L 43/0811* (2013.01); *H04L 43/0882* (2013.01); *H04L 43/18* (2013.01)

(58) Field of Classification Search
CPC ............... H04L 43/062; H04L 43/0811; H04L 43/0882; H04L 43/18; G06K 9/6256; G06K 9/6278
See application file for complete search history.

(56) References Cited

U.S. PATENT DOCUMENTS

| | | | | |
|---|---|---|---|---|
| 5,870,399 | A * | 2/1999 | Smith | H04L 43/00 370/465 |
| 9,473,380 | B1 * | 10/2016 | Bermudez | G06F 16/9535 |
| 10,104,207 | B1 * | 10/2018 | Rougier | H04L 69/26 |
| 10,135,847 | B2 | 11/2018 | Althouse et al. | |
| 10,200,259 | B1 * | 2/2019 | Pukish | H04L 63/1425 |
| 2009/0197681 | A1 * | 8/2009 | Krishnamoorthy | G06Q 30/02 463/42 |
| 2011/0173198 | A1 * | 7/2011 | Malleshaiah | G06F 16/337 707/737 |
| 2014/0019609 | A1 * | 1/2014 | Williams | H04L 43/028 709/224 |
| 2015/0215429 | A1 * | 7/2015 | Weisblum | H04L 43/18 370/475 |
| 2017/0076256 | A1 * | 3/2017 | Castel | G06Q 50/01 |
| 2017/0093675 | A1 * | 3/2017 | Chuang | H04L 41/0896 |
| 2019/0356564 | A1 * | 11/2019 | Kaneko | H04L 43/062 |
| 2020/0028771 | A1 * | 1/2020 | Wong | H04L 43/067 |
| 2020/0210871 | A1 * | 7/2020 | Alperovich | G06N 7/005 |
| 2020/0351191 | A1 * | 11/2020 | Lin | H04L 43/028 |

(Continued)

OTHER PUBLICATIONS

Corelight Blog; "https://corelightblog.wordpress.com/author/corelightblogadmin/page/3/", Jul. 17, 2018 (Year: 2018).*

(Continued)

*Primary Examiner* — Jerry B Dennison
(74) *Attorney, Agent, or Firm* — DLA Piper LLP (US)

(57) ABSTRACT

A system and method for traffic classification using snippets and on-the-fly traffic classifiers can build traffic classifiers that leverage interpretable feature sets without the need to inspect payloads—ensuring functionality across clear-text and encrypted flows. In one embodiment, the system identifies n-grams ("snippets") in a network flow's sequence-of-message-lengths that are strongly indicative of a given class of traffic and predicts a network flow's class by assessing the presence of snippets relevant to different classes.

18 Claims, 8 Drawing Sheets

(56) References Cited

U.S. PATENT DOCUMENTS

| | | | |
|---|---|---|---|
| 2020/0389469 A1* | 12/2020 | Litichever | H04L 63/1425 |
| 2021/0105304 A1* | 4/2021 | Kraning | G06Q 10/0635 |
| 2021/0185066 A1* | 6/2021 | Shah | G06N 20/10 |

OTHER PUBLICATIONS

Moore, Andrew W; "Internet Traffic Classifcation Using Bayesian Analysis Techniques" ;SIGMETRICS'05, Jun. 6-10, 2005 (Year: 2005).*

TaoSecurityBlog; "Port Independent Protocol Identification"; "https://taosecurity.blogspot.com/2006/09/port-independent-protocol.html"; Sep. 7, 2006 (Year: 2006).*

Laurent Bernaille; "Traffic Classification On The Fly"; ACM SIGCOMM Computer Communication Review; vol. 36, No. 2, Apr. 2006 (Year: 2006).*

Draper-Gil et. Al.; "Characterization of Encrypted and VPN Traffic using Time-related Features", Proceedings of the 2nd International Conference on Information Systems Security and Privacy (ICISSP 2016), Conference Paper dated Feb. 2016, pp. 407-414, 9 pages.

Niemczyk et al.; "Identification over encrypted Channels", HP DVLabs, Jul. 1, 2014, 12 pages. https://raw.githubusercontent.com/bniemczyk/pacumen/master/paper/pacumen.pdf.

GGFAST: A General Framework for Building Network Traffic Classifiers, ACM SIGCOMM 2021, 16 pages.

Yuan et al.; "An SVM-based machine learning method for accurate internet traffic classification", Springer Science + Business Media, LLC 2008, 8 pages.

Zander et al.; "Automated Traffic Classification and Application Identification using Machine Learning", Centre for Advanced Internet Architectures Swinburne University of Technology, Melbourne, Australia, Proceedings of the IEEE Conference on Local Computer Networks 30th Anniversary (LCN'05), 2005 IEEE, 8 pages.

Wang et al.; "Unknown Pattern Extraction for Statistical Network Protocol Identification", School of Information Technology, Deakin University, Melbourne, Australia, 40th Annual IEEE Conference on Local Computer Networks, LCN 2015, downloaded on Mar. 2, 2021, 4 pages.

Lin et al.; "Application classification using packet size distribution and port association", Journal of Network and Computer Applications, Elsevier Ltd., Accepted Mar. 3, 2009, 8 pages.

Bernaille et al.; "Traffic classification on the fly", Universite' Pierre et Marie Curie—Paris VI, Thomson Paris Lab, Computer Communication Review, Association for Computing Machinery, 2006, 36 (2),pp. 23-26., 10.1145/1129582.1129589, hal-01097551, submitted on Dec. 19, 2014, 5 pages.

Dhamankar et al.; "Protocol Identification via Statistical Analysis (PISA)", Black Hat 2007, TippingPoint Technologies, 9 pages.

Karagiannis et al.; "BLINC: Multilevel Traffic Classification in the Dark", SIGCOMM'05, Aug. 21-26, 2005, Philadelphia, Pennsylvania, USA, 12 pages.

Auld et al.; "Bayesian Neural Networks for Internet Traffic Classification", IEEE Transactions on Neural Network, vol. 18, No. 1, Jan. 2007, 18 pages.

Bernaille et al.; "Early Application Identification", Universite' Pierre et Marie Curie—LIP6, CNRS Paris, France, CONEXT '06 Lisboa, Portugal, 12 pages.

McGregor et al.; "Flow Clustering Using Machine Learning Techniques", The University of Waikato, Private BAG 3105, Hamilton, New Zealand and The National Laboratory of Applied Network Research (NLANR), San Diego Supercomputer Center, University of California San Diego, 10100 Hopkins Drive, CA92186-0505, USA, Conference Paper in Lecture Notes in Computer Science • Apr. 2004, DOI: 10.1007/978-3-540-24668-8_21 • Source: DBLP, 11 pages.

Este et al.; "Support Vector Machines for TCP Traffic Classification", DEA, Università degli Studi di Brescia, via Branze, 38, 25123 Brescia, Italy, preprint submitted to Computer Networks, May 12, 2009, 32 pages.

Areström et al.; "Early Online Classification of Encrypted Traffic Streams using Multi-fractal Features", Linköping University, Sweden, The definitive version is published in Proc. IEEE INFOCOM Workshop on Intelligent Cloud Computing and Networking (IEEE ICCN @INFOCOM), Paris, France, Apr./May 2019, and is available at IEEE Xplore Digital Library via http://dx.doi.org/[doi], 6 pages.

Iliofotou et al.; "Network Monitoring using Traffic Dispersion Graphs (TDGs)", IMC'07, Oct. 24-26, 2007, San Diego, California, USA, 6 pages.

Hernández-Campos et al.; "Statistical Clustering of Internet Communication Patterns", Department of Statistics, University of North Carolina at Chapel Hill, 16 pages.

Moore et al.; "Internet Traffic Classification Using Bayesian Analysis Techniques", IGMETRICS'05, Jun. 6-10, 2005, Banff, Alberta, Canada, 11 pages.

Crotti et al.; "Traffic Classification through Simple Statistical Fingerprinting", DEA, Università degli Studi di Brescia, Italy, ACM SIGCOMM Computer Communication Review, vol. 37, No. 1, Jan. 2007, 10 pages.

Roughan et al.; "Class-of-Service Mapping for QoS: A Statistical Signature-based Approach to IP Traffic Classification", School of Mathematical Sciences, University of Adelaide, SA 5005, Australia and AT&T Labs—Research, Florham Park, NJ 07932-0971, USA, IMC'04, Oct. 25-27, 2004, Taormina, Sicily, Italy, 14 pages.

Anderson et al.; "Machine Learning for Encrypted Malware Traffic Classification: Accounting for Noisy Labels and Non-Stationarity", Cisco Systems, Inc., KDD 2017 Applied Data Science Paper, KDD'17, Aug. 13-17, 2017, Halifax, NS, Canada, 10 pages. DOI: http://dx.doi.org/10.1145/3097983.3098163.

Xie et al.; "SubFlow: Towards Practical Flow-Level Traffic Classification", University of California Riverside and Narus, Inc., The 31st Annual IEEE International Conference on Computer Communications: Mini-Conference, 5 pages.

Alizadeh et al.; "Timely Classification and Verification of Network Traffic Using Gaussian Mixture Models", Article in IEEE Access, Jan. 2020, accepted Apr. 10, 2020, date of publication May 6, 2020, date of current version May 28, 2020, 17 pages. DOI: 10.1109/ACCESS.2020.2992556.

Moore et al.; "Toward the Accurate Identification of Network Applications", University of Cambridge and Intel Research, Cambridge, Conference Paper in Lecture Notes in Computer Science, Mar. 2005, 15 pages. (Source: DBLP) DOI: 10.1007/978-3-540-31966-5_4.

Qin et al.; "Towards a Profiling View for Unsupervised Traffic Classification by Exploring the Statistic Features and Link Pattern", NetAI '19, Aug. 23, 2019, Beijing, China. © 2019 Association for Computing Machinery, ACM ISBN 978-1-4503-6872-8/19/0 https://doi.org/10.1145/3341216.3342213.

Dreger et al.; "Dynamic Application—Layer Protocol Analysis for Network Intrusion Detection", 16 pages.

Wright et al.; "Using Visual Motifs to Classify Encrypted Traffic", Johns Hopkins University Information Security Institute Baltimore, MD 21218, VizSEC'06, Nov. 3, 2006, Alexandria, Virginia, USA, 10 pages.

Lu et al.; "High performance traffic classification based on message size sequence and distribution", Journal of Network and Computer Applications 76 (2016) 60-74, © 2016 Elsevier Ltd., Accepted Sep. 29, 2016Available online Oct. 15, 2016, 15 pages. http://dx.doi.org/10.1016/j.jnca.2016.09.013.

Shim et al.; "Application Traffic Classification using Payload Size Sequence Signature", Department of Computer and Information Science, Korea University, Sejong, South Korea, International Journal of Network Management, revised Mar. 6, 2017, Accepted Apr. 24, 2017, 17 pages. DOI: 10.1002/nem.1981.

* cited by examiner

SSH: <(-1152,-16), FLOAT, False>

SMTPS: <([-∞, -1], [20,53], [-∞, -1], [1,11],[-∞, -1]), LEFT@0, False>

SMTP: <([1,∞], -21, [1,∞]), RIGHT@12, False>

Kerberos over TCP: <([1528,3130], [-1977,-1494]), LEFT@0, False> & <([-∞, -1],[-∞, -1]), FLOAT, True>

FIGURE 2

| Outgoing messages | Incoming messages |
|---|---|
| Original SOL | Original SOL |
| Entropy-driven encoding | Entropy-driven encoding |
| Entropy-driven encoding | Single bin |
| Single bin | Entropy-driven encoding |
| Single bin | Single bin |

FIGURE 5

Algorithm 1: Snippet selection algorithm for $M(S)$, the match set for snippet $S$.

Data: $D$, the weighted set of samples; $S$, the set of snippets.
Result: F, the set of candidate snippets.
$F \leftarrow [\,]$
$mask \leftarrow \emptyset$
while $D \neq mask$ do
    $S \leftarrow best\_snippet(D, S, mask)$
    $F.append(S)$
    $mask \leftarrow mask \cup M(S)$
end

FIGURE 6

| Parameter name | GGFAST step | Significance | Parameter value |
|---|---|---|---|
| Information gain threshold | Grouping | Influences the number of message-size bins | $2^{-7}$ |
| Snippet similarity $\delta$ | Filtering | Consider two snippets this close as equivalent | 0.95 |
| Snippet cutoff | Filtering | Maximum number of snippets per class after filtering | 2,500 |
| Minimum true positive rate | Selection | Requirement for adding a snippet to the feature set | 0.1% |
| False positive threshold | Selection | Maximum false positive rate of the selected snippets | Variable |

FIGURE 7

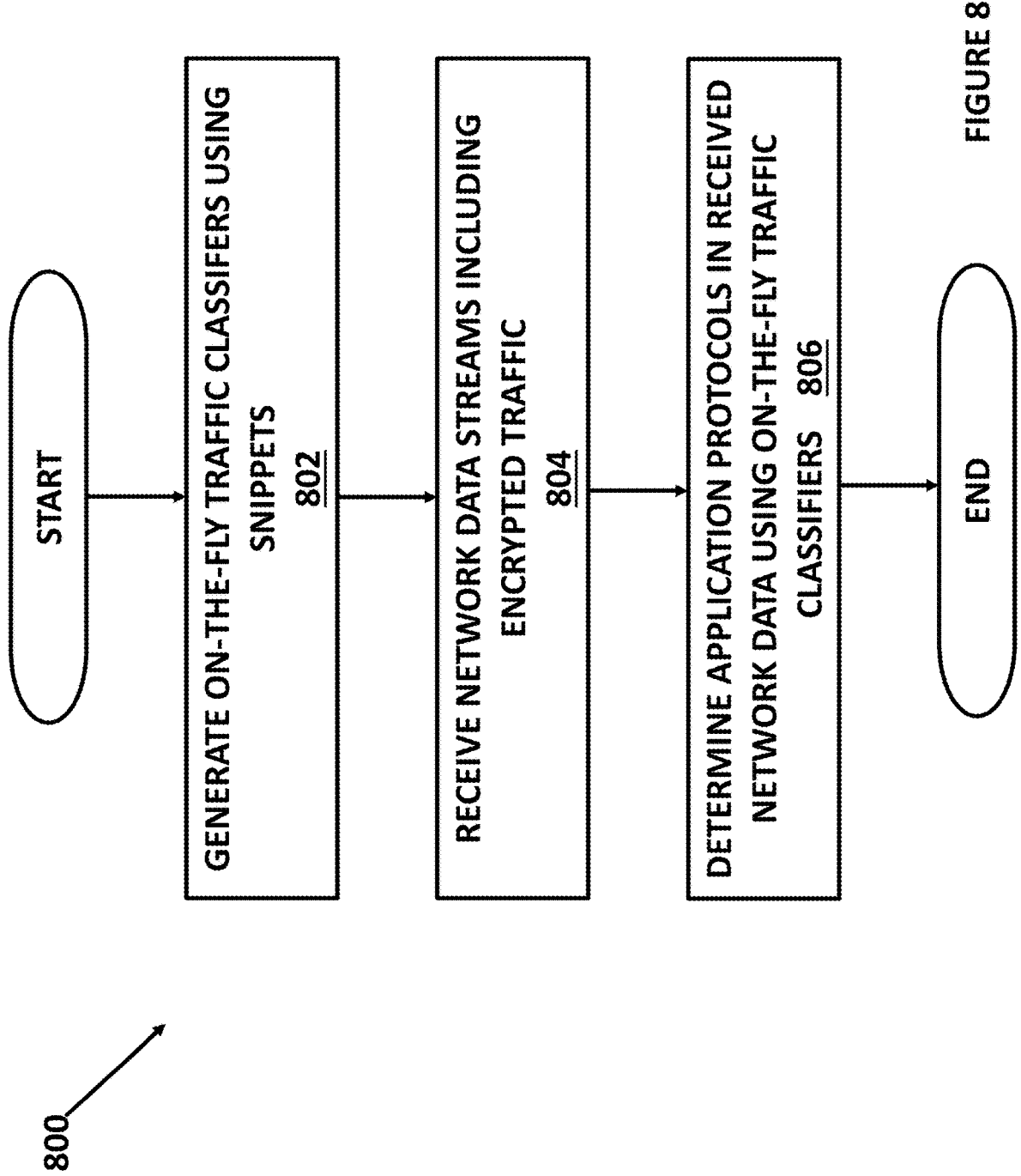

SYSTEM AND METHOD FOR NETWORK TRAFFIC CLASSIFICATION USING SNIPPETS AND ON THE FLY BUILT CLASSIFIERS

APPENDIX

Appendix A (16 pages) is a paper that discloses some aspects of system and method and provides example datasets and results that are all incorporated herein by reference.

FIELD

The disclosure relates to network traffic analysis, and more precisely, application protocol network traffic classification which is the task of identifying the application protocol(s) in use within particular network flows.

BACKGROUND

In today's world, there are a vast number of computer networks over which data and commands (each a network flow) are communicated. The computer networks may be a computer network of an entity like a company, the Internet, etc. On each computer network, there are a vast number of network flows in which each network flow may be a communication of data and/or commands between two endpoints using one or more applications and a particular protocol for each application ("application protocol"). It is desirable to be able to classify the traffic, i.e., determine the application protocol(s) in use in each network flow. It is also very desirable to be able to perform traffic classification on encrypted traffic. It is a technical problem to be able to perform traffic classification since the task requires some technique to sift through the incredibly large number of network flows and the digital data of those network flows. It would be impossible for a human to try to perform this traffic classification. Traffic classification provides important basic information for network security analysts and monitoring systems such as detecting nefarious activities or other network issues. In order to run on large networks at line rate, acceptable traffic classification solutions need to operate in a highly efficient manner and also need to achieve high accuracy, even on encrypted network flows. Finally, analysts tend to hold a higher level of confidence in traffic classification tools that produce interpretable and understandable decisions. These are some of the technical problems that need to be overcome for a traffic classification technique.

Currently, there are five main approaches to traffic classification. The first approach is using Internet Assigned Numbers Authority (IANA) port assignments to identify applications. This approach is ineffective due to the use of servers running off-port (either for convenience, or to deliberately evade detection), along with the rise of protocols with no associated IANA assignments, such as P2P applications. Thus, this approach cannot effectively perform the desired traffic classification.

A second known approach is pattern-matching or parsing against transport payload in which known patterns within the application's payload are used for traffic classification. This approach is discussed in more detail in two articles: "Dynamic Application-Layer Protocol Analysis for Network Intrusion Detection" by Holger Dreger, Anja Feldmann, Michael Mai, Vern Paxson, and Robin Sommer in 2006 (15th USENIX Security Symposium); and "Toward the Accurate Identification of Network Applications. In International Workshop on Passive and Active Network Measurement" by Andrew W Moore and Konstantina Papagiannaki (2005) published by Springer. This second approach requires extensive manual effort on a per-application basis, in order to craft patterns, may prove too expensive to employ on very high speed links, and cannot be applied to encrypted traffic and thus cannot achieve the desirable traffic classification.

A third known approach for traffic classification is using behavioral models that record which hosts communicate on which ports. This approach is discussed in more detail in several articles including: "Network Monitoring using Traffic Dispersion Graphs (TDGs)" by Marios Iliofotou, Prashanth Pappu, Michalis Faloutsos, Michael Mitzenmacher, Sumeet Singh, and George Varghese (2007) in Proceedings of the 7th ACM SIGCOMM Conference on Internet Measurement at pages 315-320; "BLINC: Multilevel Traffic Classification in the Dark" by Thomas Karagiannis, Konstantina Papagiannaki, and Michalis Faloutsos, In Proc. ACM SIGCOMM 2005; and "Towards a Profiling View for Unsupervised Traffic Classification by Exploring the Statistic Features and Link Patterns" by Meng Qin, Kai Lei, Bo Bai, and Gong Zhang, In Proceedings of the 2019 Workshop on Network Meets AI & ML. This third type of solution is complicated in the presence of NAT devices or other connection proxying services and thus also does not achieve the goal of traffic classification.

A fourth approach is to use statistic profiling in several different manners. A first technique uses statistical profiling based on summary statistics of flow-related values to describe connections, generally including packet sizes, direction, and inter-arrival timings which is well understood and described in various articles including: "Timely Classification and Verification of Network Traffic using Gaussian Mixture Models" by Hassan Alizadeh, Harald Vranken, Andre Zuquete, and Ali Miri (2020) in IEEE Access; "Protocol Identification via Statistical Analysis (PISA)" by Rohit Dhamankar and Rob King (2007) in White Paper, Tipping Point; "Characterization of Encrypted and VPN Traffic using Time-Related Features" by Gerard Draper-Gil, Arash Habibi Lashkari, Mohammad Saiful Islam Mamun, and Ali A Ghorbani (2016) In Proceedings of the 2nd International Conference on Information Systems Security and Privacy (ICISSP); "Statistical Clustering of Internet Communication Patterns" by Felix Hernandez-Campos, AB Nobel, FD Smith, and K Jeffay (2003) in Computing Science and Statistics 35; "BLINC: Multilevel Traffic Classification in the Dark" by Thomas Karagiannis, Konstantina Papagiannaki, and Michalis Faloutsos in In Proc. ACM SIGCOMM 2005; "Flow Clustering using Machine Learning Techniques" by Anthony McGregor, Mark Hall, Perry Lorier, and James Brunskill (2004) in International Workshop on Passive and Active Network Measurement published by Springer; "Class-of-Service Mapping for QoS: a Statistical Signature-Based Approach to IP Traffic Classification" by Matthew Roughan, Subhabrata Sen, Oliver Spatscheck, and Nick Duffield (2004) in Proceedings of the 4th ACM SIGCOMM Conference on Internet Measurement; "Unknown Pattern Extraction for Statistical Network Protocol Identification" by Yu Wang, Chao Chen, and Yang Xiang in 2015 IEEE 40th Conference on Local Computer Networks; "Subflow: Towards Practical Flow-Level Traffic Classification" by Guowu Xie, Marios Iliofotou, Ram Keralapura, Michalis Faloutsos, and Antonio Nucci in 2012 Proceedings IEEE INFOCOM; "An SVM-based Machine Learning Method for Accurate Internet Traffic Classification" by Ruixi Yuan, Zhu Li, Xiaohong Guan, and Li Xu (2010) in Information Systems Frontiers 12, 2, at pages 149-156; and "Automated Traffic Classification and Application Identification using Machine Learning" by Sebastian Zander, Thuy Nguyen, and Grenville Armitage (2005) in The IEEE Conference on Local Computer Networks 30th Anniversary. A second technique using statistical profiling based on overall size distributions that is described in further detail in various articles including: "Traffic Classification through Simple Statistical Fingerprinting: by Manuel Crotti, Maurizio Dusi, Francesco Gringoli, and Luca Salgarelli (2007) in SIGCOMM Comput. Commun. Rev. 37. https://doi.org/10.1145/1198255.1198257; "Application Classification using Packet Size Distribution and Port Association" by Ying-Dar Lin, Chun-Nan Lu, Yuan-Cheng Lai, Wei-Hao Peng, and Po-Ching Lin (2009) in Journal of Network and Computer Applications 32; and "Using Visual Motifs to Classify Encrypted Traffic" by Charles V Wright, Fabian Monrose, and Gerald M Masson (2006) in Proceedings of the 3rd International Workshop on Visualization for Computer Security. A third technique is statistical profiling based on features derived from applying DSP techniques to sequences of lengths and times that is further described in articles including: "Early Online Classification of Encrypted Traffic Streams using Multi-fractal Features" by Erik Arestrom and Niklas Carlsson in IEEE INFOCOM 2019 Conference on Computer Communications Workshops; "Bayesian Neural Networks for Internet Traffic Classification" by Tom Auld, Andrew W Moore, and Stephen F Gull (2007) in IEEE Transactions on Neural Networks; and "Internet Traffic Classification using Bayesian Analysis Techniques" by Andrew W Moore and Denis Zuev in Proceedings of the 2005 ACM SIGMETRICS International Conference on Measurement and Modeling of Computer Systems. Each of the statistical profiles techniques requires large feature sets, which hinder interpretability. These approaches also use aggregate features, which cannot leverage fine-grained information such as specific patterns of packet sizes.

A fifth known approach for traffic classification uses sequence-of-lengths information. A first technique using sequence-of-lengths ("SoL") performs the process based on the size of the first N packets as detailed in articles including: "Machine Learning for Encrypted Malware Traffic Classification: Accounting for Noisy Labels and Non-Stationarity" by Blake Anderson and David McGrew (2017) in Proceedings of the 23rd ACM SIGKDD International Conference on Knowledge Discovery and Data Mining; "Traffic Classification on the Fly" by Laurent Bernaille, Renata Teixeira, Ismael Akodkenou, Augustin Soule, and Kave Salamatian (2006) in ACM SIGCOMM Computer Communication Review 36; "Early Application Identification" by Laurent Bernaille, Renata Teixeira, and Kave Salamatian in Proceedings of the 2006 ACM CoNEXT Conference; and "Support Vector Machines for TCP Traffic Classification" by Alice Este, Francesco Gringoli, and Luca Salgarelli (2009) in Computer Networks 53. A second technique using sequence-of-lengths performs the process based on one or more complex features, such as identifying succinct fingerprints by looking for packets of certain sizes within fixed time intervals, representative of each traffic class as described in "Identification over encrypted Channels" by Brandon Niemczyk and Prasad Rao (2014) from BlackHat USA. Another example takes a pattern-based approach to traffic classification by finding the labeled sample that shares a longest common subsequence with an unknown sample as described in "High Performance Traffic Classification based on Message Size Sequence and Distribution" by Chun-Nan Lu, Chun-Ying Huang, Ying-Dar Lin, and Yuan-Cheng Lai (2016) in Journal of Network and Computer Applications 76. Finally, another technique uses SOLs as signatures by finding a set of sequences that represent each class and computing the distance of each new sample to these representatives as detailed in "Application Traffic Classification using Payload Size Sequence Signature" by Kyu-Seok Shim, Jae-Hyun Ham, Baraka D Sija, and Myung-Sup Kim (2017) in International Journal of Network Management 27. This last type of solution cannot capture application-specific activity and may be unable to effectively label the traffic.

These known system have limitations and technical problems. For example, the known systems often use the same features for all problems and is thus less accurate. Some known systems use large and complex feature sets that are computationally expensive. Thus, it is desirable to provide a system and method for traffic classification that overcomes the above technical problems with known traffic classification approaches and it is to this end that the disclosure is directed.

BRIEF DESCRIPTION OF THE DRAWINGS

FIG. 2 illustrates an example of snippets that may be used by the system and method to generate the traffic classifiers and perform traffic classification;

FIG. 5 is a table showing an example of the encoding variants used in the method in FIG. 4;

FIG. 6 illustrates pseudocode of a method for selecting snippets for the feature set of the method in FIG. 4;

FIG. 7 is a table showing an example of the parameters used in an embodiment of the method in FIG. 4; and FIG. 8 illustrates a method for traffic classification using the generated traffic classifiers.

DETAILED DESCRIPTION OF ONE OR MORE EMBODIMENTS

Figure 1:
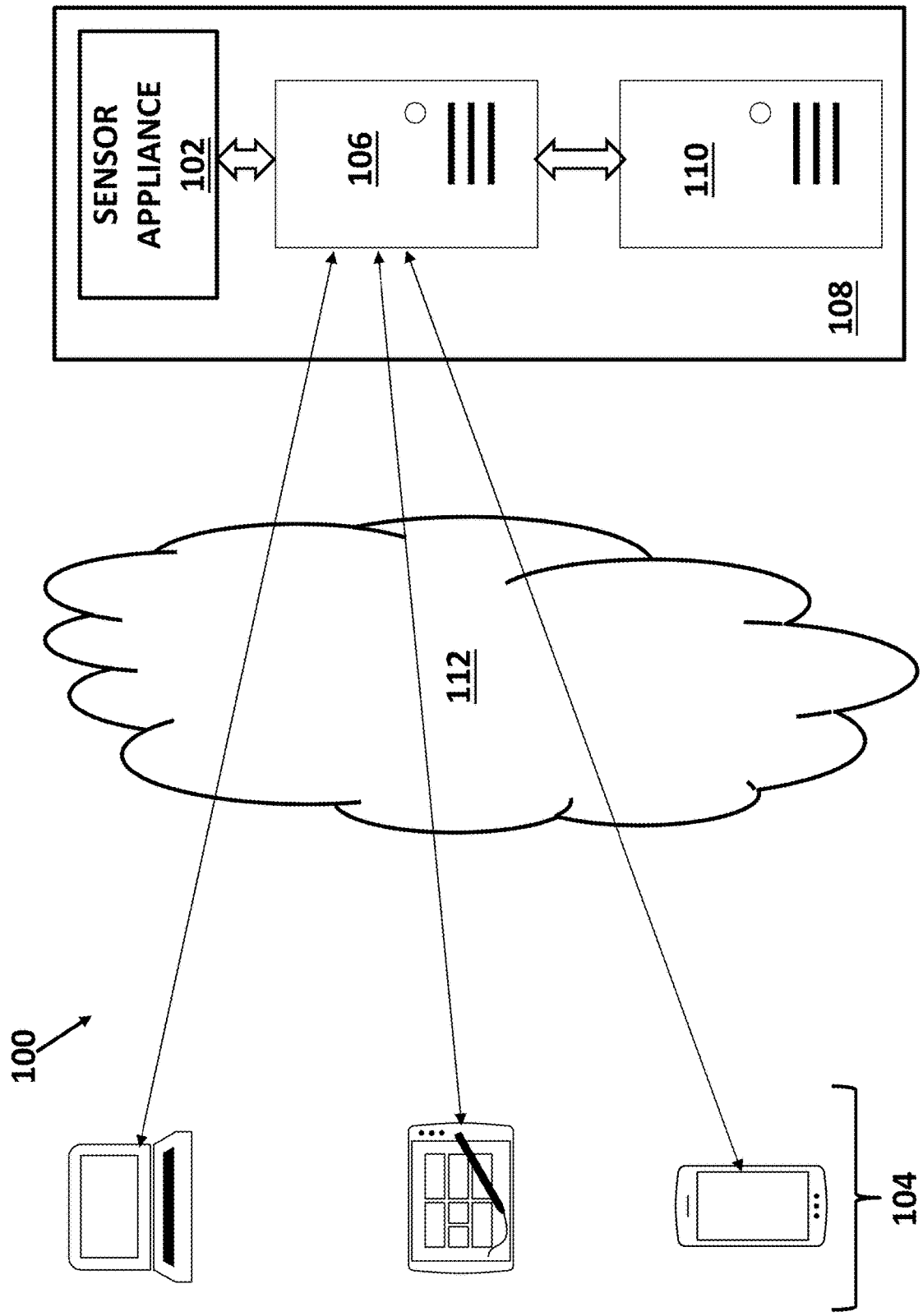
FIG. 1 is a diagram of a system having a sensor appliance for traffic classification using snippets and on the fly classifiers.

The disclosure is particularly applicable to a network classification system and method that uses snippets to train one or more classifiers and then uses the trained classifiers to determine application protocols in encrypted traffic set forth below and it is in this context that the disclosure will be described. It will be appreciated, however, that the system and method has greater utility, such as to network classification using different snippets than those disclosed that are within the scope of the disclosure. Furthermore, the system may be used to identify other data protocols in the network traffic and equally works on unencrypted or encrypted network traffic. The disclosed system and method overcomes the limitations and technical problems of the above known techniques and approaches.

The disclosed system and method provides technical solutions and improvements over the known systems. For example, the system and method generates custom features that are characteristic of each specific application that overcomes the limitations of known system that use the same features for all problem. The system and method uses a simple machine learning model, binary features, and in most cases has small feature sets that overcomes the computational expensive problem with known technique that use large and complex feature sets. The disclosed system and method is also able to automatically detect instances of a protocol when tunneled within SSH that is not possible with the known techniques.

The disclosed system and method provides a technical solution to the above technical problem in network traffic monitoring in which the system and method uses snippets to train an on-the-fly traffic machine learning traffic classifier(s) that can then be used to detect one or more application protocol(s) even in encrypted network data traffic. This traffic classification cannot be performed by a human being and represents a technical improvement over the known traffic classification approaches above. The disclosed system and method may be used in various contexts including network security monitoring, incident response and network forensics and/or mis-use detection. For the network security monitoring context, the determination of the type of traffic may reveal certain user actions or network intrusions. Same advantage may exist for incidence response or mis-use detection.

The system and method builds classifiers from any labeled traffic data, including compound labels such as "Kerberos-and-then-SMB" without requiring manual crafting of per-application features and without requiring access to application payloads. The system and method can execute in a highly efficient manner suitable for running at scale on large networks. The system and method use the fact that application protocol state machines follow standardized grammars, and those grammars exhibit "idioms" that affect packet contents so that specific applications generate predictable ranges of packet sizes for distinct protocol states. By analyzing the sequence-of-message-lengths (SOLs) exchanged within a given network flow, the method can identify interpretable patterns that can be used to determine the underlying application with high accuracy.

FIG. 1 is a diagram of a system 100 having a sensor appliance 102 for traffic classification using snippets and on the fly classifiers. In other embodiments, the ability to train traffic classifiers and classify traffic (including application protocols) even in encrypted data may be included in other types of sensors or devices in which the data being communicated in the network data session may be captured and analyzed. A connection, during which network data traffic may be generated, may be established between each client 104 and a server 106 in a computer system or network 108. The server 106 may be positioned before other servers and computer systems 110 in the computer system or network 108 to protect the other servers and computer systems 110 in the computer system or network 108. In the example in FIG. 1, each client may be executed on various computing resources such as a laptop computer, a tablet computer, a smartphone device (examples being shown in FIG. 1) or any other processor based computing system or device.

During an established session, the sensor appliance 102 may capture the network data traffic being transferred during the session and classify the network traffic as described in more detail below. The sensor appliance 102 may have at least a processor and memory and input/output ports that allow the sensor appliance 102 to intercept/capture the data traffic. In addition, as shown and described below, the sensor appliance 102 may include a traffic classification module (preferably implemented as a plurality of instructions or computer code stored in memory and executed by the processor of the sensor appliance) that can train an on-the-fly traffic classifiers based on snippets and perform traffic classification (even on encrypted network traffic data) using the on-the-fly trained traffic classifiers and the snippets as described below in more detail.

Snippets

The system and method to build network classifiers and use the on-the-fly traffic classifiers may find sets of patterns of data in sequence-of-message-lengths (SOLs) characteristic of each class of data traffic. The patterns within sequences' lengths can reflect state transition information, specific to an application, that may be used to identify the flow's underlying protocol. Each pattern of data in the SOL may be known as a snippet. The system and method use these snippets to build the traffic classifiers (an improvement over known technology as shown by the test results set forth below) and then perform the traffic classification. In one embodiment, the system and method may build classifiers that use these snippets as features to accurately categorize arbitrary TCP or UDP data traffic.

A snippet may be a triplet that has the format: <SOL, ANCHOR, NEGATION> that contains (1) a string of lengths ("SoL") (ranges), (2) an anchor specifying the string's position, and (3) a negation flag indicating the sequence should not match. In more detail, the SOL field contains the sequence of lengths or ranges. The SOL field may include a decorator indicating the direction of the message and uses "→" for messages from flow originator to responder and "←" for messages in the other direction. The decorators are implemented in one embodiment in which negative values encode traffic from the server towards the client and positive values encode traffic from the client to the server.

The ANCHOR field contains information about the position of the sequence. In one embodiment, the system and method may encode three types of anchors including: 1) Anchored-left: snippets that occur at a fixed position in the SOL starting from the beginning of the connection (positive anchors); 2) Anchored-right: snippets that occur at a fixed position relative to the end of the SOL (negative anchors). In one current embodiment, the system uses the Anchored-right anchor for TCP connections that terminate with a proper FIN exchange; and 3) Unanchored: snippets that occur anywhere in the SOL. Thus, for example, the values for the ANCHOR field may be LEFT@x that means the sequence occurs at position x starting from the beginning of the network flow, RIGHT@y that means the sequence occurs y packets before the end of the flow, and FLOAT that means the sequence can occur anywhere in the flow.

The NEGATION field contains a boolean flag set to True if the class should not contain the snippet and set to False if the class should contain the snippet. In addition to individual snippets, the system and method may identify and use conjunction snippets which are each an aggregation of multiple snippets wherein each of the individual snippets are separated with an ampersand.

In the disclosed traffic classification process, a snippet matches a sample when the string is present in that sample's SOL at the position indicated by the anchor (negation flag not set); or the sample does not contain such a string (negation flag set). The disclosed traffic classification process also may identify a conjunction of snippets which is a set of snippets that all match. For example, a snippet of $<(10^{\rightarrow}, 5^{\leftarrow}), 0, False>$ matches SOLs that start with the sequence $(10^{\rightarrow}, 5^{\leftarrow})$; one of $<(15^{\rightarrow},[1^{\leftarrow}, \infty^{\leftarrow}), 10^{\rightarrow}), -3, False>$ matches SOLs that end with any sequence $(15^{\rightarrow}, x^{\leftarrow}, 10^{\rightarrow})$ where x is any message length from the server; and $<(7^{\rightarrow}),\varepsilon, True>$ matches SOLs that do not contain any outgoing message of length 7.

FIG. 2 illustrates an example of snippets that may be used by the system and method to generate the traffic classifiers and perform traffic classification. In particular, FIG. 2 shows partial snippets from four exemplary protocols including well known SSH, SMTPS, SMTP and Kerberos over TCP. The traffic classification system and method is not limited to only being able to classify traffic from the protocols shown in FIG. 2 and the protocols are simply illustrative. Other protocols for which traffic may be classified using the disclosed system and method may include other protocols operating under encryption such as DNS over HTTPS or DNS over TLS since these encrypted traffic streams cannot be classified by traditional payload inspection methods for the reasons discussed above.

In examples in FIG. 2, the Kerberos over TCP snippet has been generated by the system wherein this example is a conjunction snippet with the ampersand in the middle of the two snippets. This snippet can be used to train a traffic classifier that is used to identify Kerberos over TCP traffic in the network traffic. Using this trained traffic classifier, the system and method uses the snippet in FIG. 1 to determine, for the flow "2000, −1700", the snippet is matched because first snippet in the conjunction matches (the length values are within the range in the first snippet) and the second snippet does not (it should not since its negation flag is set to True) so that the conjunction matches. In a second example, the flow "2000, −1700, −1700" is not classified as Kerberos traffic because while the first snippet still matches, there are two consecutive negative lengths and thus the conjunction does not match. In this manner, the system and method discovers/generates the snippets, trains a traffic classifier based on the snippets and then uses the trained classifier to perform traffic classification for all of the different types of traffic including secure shell (SSH) protocol traffic, secure simple mail transfer protocol (SMTPS) traffic, simple mail transfer protocol (SMTP) protocol traffic and Kerberos over transmission control protocol (TCP) protocol traffic and/or traffic for other protocols.

Figure 3:
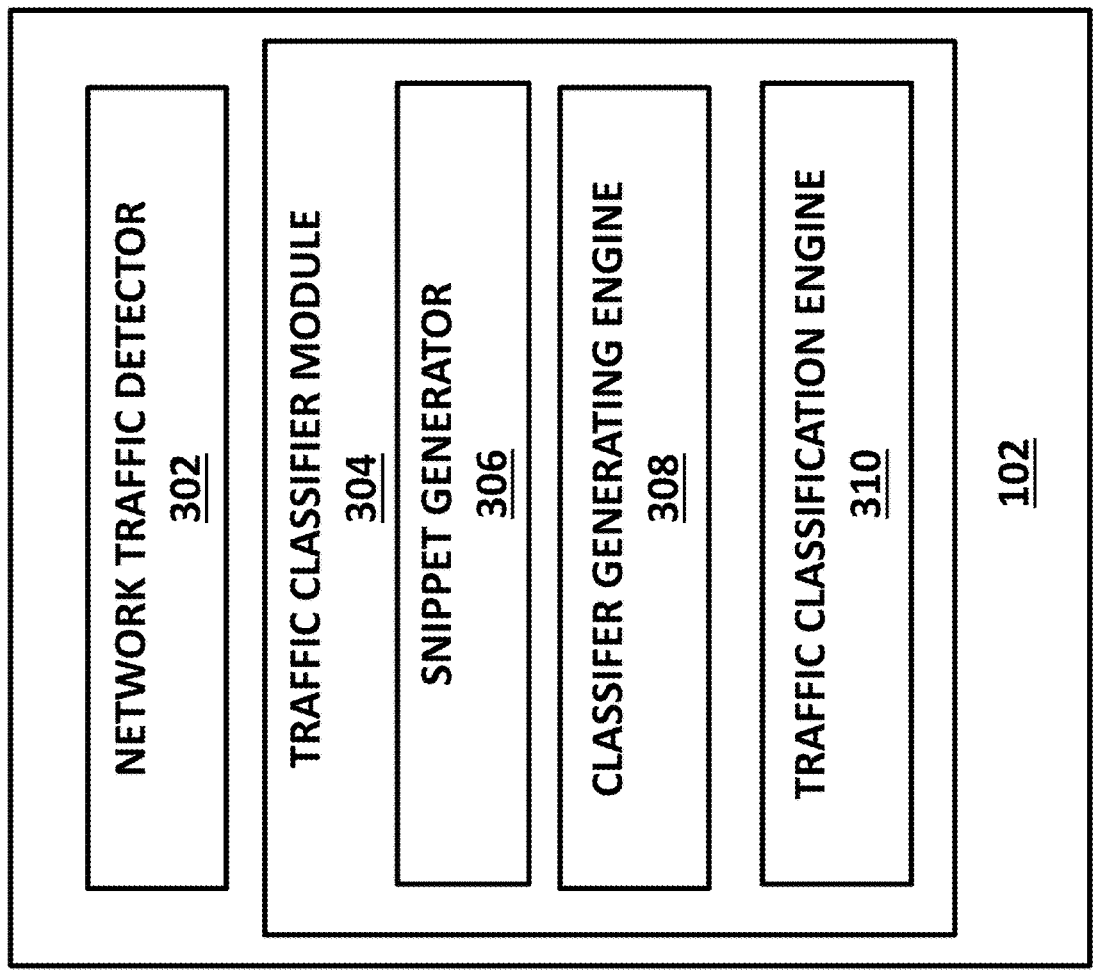
FIG. 3 illustrates further details of the traffic classifier when implemented in the sensor appliance.

FIG. 3 illustrates further details of the traffic classifier 304 when implemented in the sensor appliance 102. The sensor appliance 102 may also have a well-known network traffic detector/capture module 302 that captures the network traffic so that the one or more snippets are generated, the classifiers are trained based on the snippets and the application protocols in the network traffic can be classified by the system. The sensor appliance 302 may also have a traffic classifier module 304. The traffic classifier module 304 and its sub-elements 306-310 may each be implemented as a plurality of lines of computer code/instructions that are each executed by a processor of the sensor appliance 102 or in a hardware device (state machine, memory, microcontroller, FPGA, etc.) either of which implement the processes of each element (and the methods in FIGS. 4 and 8) described below.

The traffic classifier module 304 may further include a snippet generator 306, a classifier generator engine 308 and a traffic classification engine 310. The snippet generator 306 may parse the traffic flow (captured by the network traffic detector 302) and generate the one or more snippets (examples of which are shown in FIG. 3). The classifier generator engine 308 receives the one or more snippets and trains one or more classifiers for each of the one or more application protocols as discussed below in more detail with reference to FIG. 4. The traffic classification engine 310 receives the network traffic from the network traffic detector/capture module 302 and the one or more trained traffic classifiers and detects/identifies/determines which application protocols are contained in the network traffic as discussed in more detail below with reference to FIG. 5.

Figure 4:
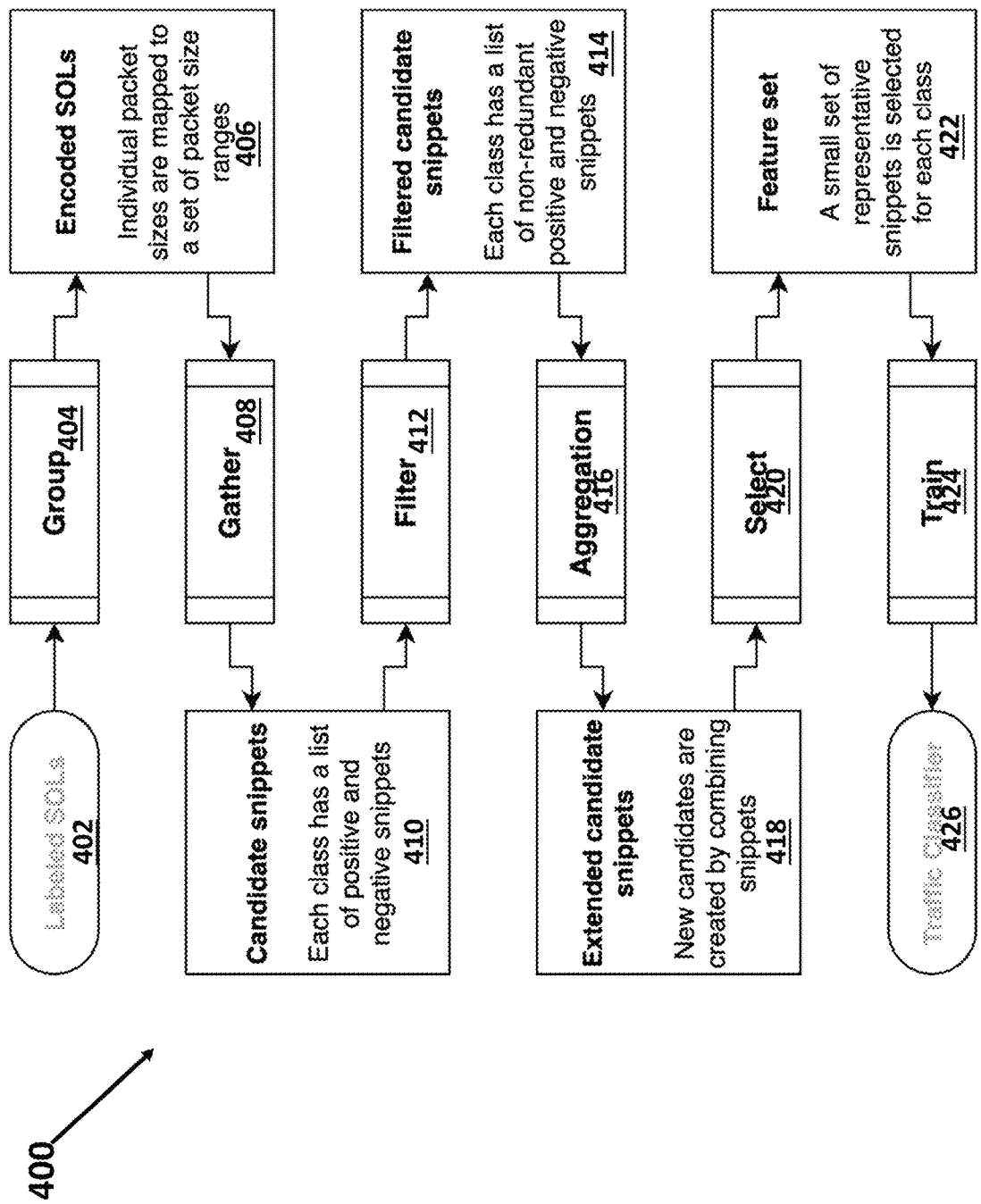
FIG. 4 illustrates a method for generating traffic classifiers using snippets wherein the traffic classifiers may be used by the system in FIG. 1.

FIG. 4 illustrates a method 400 for generating traffic classifiers using snippets wherein the traffic classifiers may be used by the system in FIG. 1. The method may be performed by a processor of the sensor application in FIG. 1 or any other processor or implemented in a hardware device. The method involves one or more processes 402-426 that together generate the traffic classifiers. In general, the method involves: 1) grouping that allows for consideration of ranges of values, crucial for detecting applications with variable message sizes, gathering that allows a large list of candidate snippets to be built that repeatedly appear in the training samples; 2) filtering that removes redundant snippet sets, helping to ensure that an efficient set of snippets are selected as features (for example, this process removes over 80% of potential snippets in evaluation traces; 3) aggregation that combines multiple atomic snippets (features) into a conjunction since samples will generally contain multiple protocol idioms and thus likely match more than one characteristic snippet. Combining snippets that often appear in the same SOLs allows the method to reduce false positives. (For our evaluation traces, this step leads to a 20% decrease in the final number of snippets required to characterize a class, as well as always at least slightly increasing overall accuracy); and 4) selection builds the final set of characteristic snippets for each class, intended to only match samples from the given class. These processes lead to a set of features small enough to support interpretability, characteristic of behaviors specific to each class, and near-orthogonal to avoid redundancies, enabling effective and efficient Training.

The method 400 supports generating at least two types of multilabel classifiers. The first makes predictions across N distinct classes. The second uses N+1 classes: N that represent traffic applications, and the last consisting of traffic from other sources ("unknown") and the last class being the baseline. Supporting this baseline class provides flexibility in developing the classifier, as often it proves difficult to label all of a dataset's flows, especially if collected from a large and active network. Unlike other classes, baseline does not have a set of defining snippets; the traffic classifier chooses this label when a sample does not manifest snippets from any class.

The method 400 uses the snippets described above and each network flow may be represented by their feature vectors. If $S=\{s_1\}$ is the set of snippets, then f is a vector of indicator features such that $f_1=1 \Leftrightarrow s_1$ matches e. Assessing the quality of a snippets as a discerning feature for class c requires a scoring function. The method may use a log score, similar to elements of a Position Weight Matrix in DNA analysis (discussed in more detail in the "Use of the 'Perceptron' Algorithm to Distinguish Translational Initiation Sites in *E. Coli*" by Gary D Stormo, Thomas D Schneider, Larry Gold, and Andrzej Ehrenfeucht (182) in Nucleic Acids Research 10.) For the log score, let C be the set of application classes, D the training dataset, and $D_c$ the set of samples of class c. M(s) may be the match set representing the set of samples matched by snippets in which $M_c(s)=M(s) \cap D_c$ is a match set for class c which contains the samples of class c matched by s and $M_{\bar{c}}(s)=M(s) \cap (D \setminus D_c)$ that is the samples of all other classes matches by s.

In the method, the match sets are indicator vectors. If $D_i$ is the ith sample in dataset D, then $M(s)_i$ may be defined as $M(s)_i=1 \Leftrightarrow s$ matches $D_i$. The method associates a weight W with each sample in a training set of class c. For a set of samples T, W (T) gives the total weight of the samples in T. For brevity We(s) replaces Me(s) and the score (score$_c$(s)) may be defined as $$\log\left(\frac{1+W_c(s)}{W_c}\right) - \log\left(\frac{1+\sum_{c*\in C, c*\neq c} W_{C}(s)}{\sum_{c*\in C, c*\neq c} W_{C*}}\right).$$

The larger this score, the more the snippet is characteristic of class c: either because the first term is large, meaning the snippet matches a large part of the dataset for class c, or because the second term is small, meaning the snippet matches few elements of any other class.

Returning to FIG. 4, the method 400 may begin with a set of labeled sequence of lengths (SOL) (402) that may be generated from network traffic data. The set of labeled sequence of lengths may be generated programmatically using a computer executing a algorithm that is able to extract and label each sequence of lengths. The method may then group the SOLs (404) into a plurality of ranges of lengths (known as discretization). During the grouping process 404, discretized versions of the original SOL samples are generated is which discretization encodes each original length as a category, reducing the cardinality of different possible values. The method encode (406) lengths into ranges (rather than unordered sets), as doing so allows the method to retain a natural ordering amongst categories. In practice, this process 404 may replace each original length by the range (equivalently, "bin") in which it lies. For example, consider an encoding of SOL ($17^{\leftarrow}$, $3^{\rightarrow}$, $67^{\leftarrow}$, $13^{\rightarrow}$, $27^{\rightarrow}$, $10^{\leftarrow}$) with the three following bins: A: [$1^{\leftarrow}$, $\infty^{\leftarrow}$) B: [$1^{\rightarrow}$, $15^{\rightarrow}$] C: [$16^{\rightarrow}$, $\infty^{\rightarrow}$). Then the example SOL will become (A, B, A, B, C, A). Apart from reducing the number of possible values, choosing an appropriate encoding can help with building more salient snippets. Because each traffic class will (hopefully) have a different distribution of sizes, the method can craft ranges that contain more elements of one class than others. By doing so, building snippets with these ranges will help identify more apt characteristics for each class.

The ranges may be generated using entropy-based discretization of the original SOLs, similar to the technique used in the article "Multi-Interval Discretization of Continuous-Valued Attributes for Classification Learning" by Usama Fayyad and Keki Irani (1993) In Proceedings of the 13th International Joint Conference on Artificial Intelligence. First, a new dataset is built from the existing one by taking every length in every sequence and assigning to it the class of the sequence from which it was extracted. For example, if our dataset D is $\{(10^{\leftarrow}, 5^{\rightarrow}), (15^{\leftarrow}, 5^{\rightarrow})\}$, and the classes C are $\{1, 0\}$, then the discretization dataset may be:

$$D^* = \begin{bmatrix} 10^{\leftarrow} \\ 5^{\rightarrow} \\ 15^{\leftarrow} \\ 5^{\rightarrow} \end{bmatrix}$$

$$C^* = \begin{bmatrix} 1 \\ 1 \\ 0 \\ 0 \end{bmatrix}$$

From this new dataset, a proportion of these samples reflecting class c may be denoted as $p_c$. Shannon's entropy may be computed as usual across each class and probability. For example, the bin [$1^{\rightarrow}$, $\infty^{\rightarrow}$) contains samples $\{5^{\rightarrow}, 5^{\rightarrow}\}$ with respective classes (1, 0). Then each class has proportion 0.5, so this bin has an entropy of $\log(2)\approx 0.3$. In a setting with multiple bins, because these bins partition the sample space, the total entropy is the weighted average of the individual entropies, the weight being the proportion of samples in each bin.

The entropy of a bin directly relates to the proportion of elements of each class within that bin. Bins with a class imbalance will have lower entropy and the encoding helps isolate members of certain classes by lowering overall entropy. The method lowers it iteratively, by repeatedly finding the best bin to split into two bins so as to maximize the entropy loss (equivalently, information gain) between the old configuration and the new. The process is repeated until the information gain falls below an information gain threshold, after which the discretization has sufficiently separated the classes.

The Information gain threshold indicates when to stop dividing into more discretization bins. If too low, too many bins are generated; the grouping process might overfit to the input data, thus not being representative of the structure of each class. If the threshold is too high, there will not be enough bins to separate classes in the input datasets, and the encoding step will not bring provide performance gains. As an example a value of $2^{-7}$ may be used which leads to an effective number of bins to distinguish classes.

This grouping process 404 may now generate two versions of the sample set: the original, raw SOLs; and the encoded version. Using both versions allows the ensuing analysis to draw upon a more diverse set of snippets. Thus, the process may generate two more versions of the samples to fit to various types of protocols: 1) some classes of traffic might have characteristic behavior mostly in one direction of the flow. For example, when using HTTP for downloads, the messages from the server will span many different sizes, but the messages to the server, requesting the download, will generally have a limited range. To find appropriate snippets for cases like these, the process generates unidirectional encodings in which only messages in a given direction are processed using the grouping method, while assigning the opposite direction to simply one large bin; and 2) some traffic might be characterized simply by the order of the direction of traffic. For these cases, there may be a unique encoding that simply uses two bins: an outgoing (client-to-server) bin, and an incoming (server-to-client) bin.

In total, by combining all of these variants, the method ends up with 5 different versions of the original SOLs as shown in FIG. 5. Although grappling with all of these variants would prove overwhelming if done manually to sift through all the snippets, the method implements an automated process that is able to identify a highly diverse set of possibilities, increasing the chances to find sharply characteristic snippets which is a benefit over the disclosed process over a manual process.

Returning to FIG. 4, the method 400 may then gather (408) snippets from the original and discretized SOLs. The gathering process 408 aims at finding potential snippets indicative of the different application protocol classes that will then allow us to identify the application protocols even for encrypted data. In this process 408, three snippets may be generated from every subsequence of every sample, one for each anchor type. For each of these, a predominant class, i.e., the class in which it appears the most, is found. The process 408 associates the snippet with this class, and compute its score as described above. At the same time, the process 408 may find the least predominant class for each snippet, attribute the negative version of the snippet to that class, and compute its score. The process 408 then ranks each candidate snippet according to its score, returning the best 25,000 positive and 25,000 negative snippets for each class. This approach builds a large set of candidate snippets that convey both the presence and the absence of particular patterns in traffic.

By sifting through multiple encodings of the same samples, the method captures different granularities of SOLs. For example, consider POP3. Some common client commands have 4 characters (e.g., QUIT, STAT), which manifest as packets of size 6, but others range in size up to 13. Thus, both the snippet $S_1=<(6^\rightarrow), \varepsilon, \text{False}>$ and the snippet $S_2=<([6^\rightarrow, 13^\rightarrow]), \varepsilon, \text{False}>$ potentially provide power. The first will likely prove more selective, but might miss some samples. However, the method generates both snippets, leaving the selection of best candidates to a later stage of the method.

By gathering snippets for all versions of the samples generated in the Grouping stage of the method, the method will effectively get both snippets: $S_1$ will be found while combing through the raw samples, and thanks to the entropy-driven grouping of the samples, $S_2$ will naturally appear in encoded samples, which will be collected as well as the candidate snippets 410.

Returning to FIG. 4, the method may then perform a filtering (412) to generate a set of filtered candidate snippets (414). The output of the gathering provides rich information but also contains many redundancies which are two (or more) snippets that capture the same set of samples. Redundancies can occur for multiple reasons: 1) a characteristic pattern at a constant offset from the start of the SOL will generate both anchored-left and unanchored snippets associated with that pattern; 2) a pattern might be salient in multiple encodings, which will lead to multiple snippets expressed using different encodings capturing the same characteristic; and 3) snippets are often subsets of other snippets. For example, if a discerning feature of the class is that the last two packets are of size $6^\leftarrow$, then the previous step might yield the following three snippets: $<(6^\leftarrow), -2, \text{False}>$, $<(6^\leftarrow), -1, >, \text{False}>$ and $<(6^\leftarrow, 6^\leftarrow), -2, \text{False}>$.

The filtering procedure (412) aims to remove such redundancies. For snippets associated with the same class, the method defines two relational operators, $\leq_c$ and $\sim_c$ for snippets s and s' as: $s'\leq_c s \Leftrightarrow W(M_c(s) \cap M_c d(s')) \geq \delta \times W(M_c(s'))$ $\wedge W(M_{\bar{c}}(s)) \cap M_{\bar{c}}(s')) \geq \delta \times W(M_{\bar{c}}(s))$ (and $s'\sim_c s \Leftrightarrow s'\leq_c s \wedge s\leq_c s'$). Here, $\delta$, the similarity ratio parameter, enables the method to change the notion of proximity between sets: A value of 1 means the method seeks exact correspondence, thus equivalence with $\delta=1$ means the snippets capture the exact same sets. A value below 1 allows for small differences between sets.

Intuitively, the method finds that s is greater than s' occurs when s captures most of the in-class matches captured by s' (i.e., the weight of the intersection of both match sets is about that of the s' match set), and, conversely, most of out-of-class matches capture are also captured by s'. When both $s'\leq s$ and $s\leq s'$, the method may say they are equivalent, having very similar match sets in all classes. (For efficiency, the method may use a technique similar to the known MinHash to compare large sets.) This comparison operator allows this process to remove unnecessary snippets. If $s'\leq s$ and $s \not\leq s'$, the method does not need to keep s', because s will capture at least the same samples in class c and fewer samples in other classes.

The Filtering 412 compares every pair of snippets for each class. If incomparable, it keeps both. If one is strictly superior, it discards the weaker snippet. If the two are equivalent, it employs heuristics to keep the best of the two that is: 1) prefer snippets anchored to the left; then those to the right then finally unanchored snippets. Anchored snippets will tend to be more discriminant, and left-anchored ones can identify classes right upon a flow's onset; 2) prefer longer snippets, leading to fewer false positives; and 3) prefer encodings with smaller ranges, for the same reason.

In is noted that changing $\delta$ will highly influence the number of snippets that make it through the filter. Values close to 1 will remove fewer snippets, while smaller values might remove too many. In particular, the snippet similarity score represents how close two snippets need to be to consider them equivalent. If is too low, the set is reduced too much and lose information; whereas overly high values of S might keep too many snippets, leading to long computation times. In one embodiment, the method uses a value of 0.95 that allows the filtering method to significantly reduce the number of snippets without affecting the performance of the final classifier.

Returning to FIG. 4, the method may then perform an aggregation process (416) to generate a set of extended candidate snippets (418). The Aggregation stems from the observation that some protocols might be best characterized by the fact that two different snippets both match them. Each snippet individually might not provide enough discriminatory power due to also matching out-of-class samples, but the conjunction of the two will not.

For example, consider a class vector C (i.e., a vector giving the classes associated with a number of samples); two snippets $S_1$ and $S_2$; and the conjunction $S_1 \wedge S_2$:

$$C = \begin{bmatrix} 1 \\ 1 \\ 0 \\ 0 \\ 0 \end{bmatrix}, S_1 = \begin{bmatrix} 0 \\ 1 \\ 1 \\ 1 \\ 0 \end{bmatrix}, S_2 = \begin{bmatrix} 0 \\ 1 \\ 0 \\ 0 \\ 1 \end{bmatrix}, S_1 \wedge S_2 = \begin{bmatrix} 0 \\ 1 \\ 0 \\ 0 \\ 0 \end{bmatrix}$$

The conjunction eliminates all false positives, but keeps the same true positive ratio. To use conjunctions and reinforce the classification, the method extracts relevant conjunction snippets from our existing pool wherein conjunction snippets are sets of snippets that match a SOL only when all of the snippets in the set match.

Although in principle, conjunctions could be created of a large numbers of snippets, the method limits the process to aggregations of at most two snippets. Doing so keeps the computational complexity to $O(nm^2)$ for m snippets and n samples, while still providing good results. Larger conjunctions would require $O(nm^k)$ operations for k the size of the conjunction, soon becoming impractical for large training datasets.

To select the conjunction snippets, each snippet has s has an associated true positive ratio within its intended class c, defined as the weight of the samples of class c matched by s, divided by the weight of all samples of class c:

$$TP_c(s) = \frac{W_c(s)}{W_c}.$$

Similarly, the false positive ratio $FP_c(s)$ is the weight of samples of another class matched by s divided by the weight of samples not of class c. Here, the cost of a training sample t of class c is the minimum false positive ratio of a snippet of class that captures t, i.e., how many false positives captured to capture this specific sample. Thus, for the conjunction selection criteria, the method considers every pair of snippets, and add the conjunction if doing so lowers the cost of at least one sample.

Returning to FIG. 4, the method may then perform a selection process (420) to generate a feature set (422) which is a small set of snippets that cover each class. The goal is to find a set of snippets for each class that covers as much of the samples of that class as possible while keeping false positives to a minimum. The selection process is a set-cover problem in a tripartite graph wherein the left nodes are samples from the intended class, the middle nodes are the snippets, and the right nodes are the samples from other classes. The selection process 410 connect each snippet to the nodes of the samples that it matches. The problem then is to find a set of nodes from the middle (snippets) that is connected to a maximal set of nodes from the left set (positive matches), while minimizing the number of connected nodes from the right set (negative samples).

By reduction from the hitting-set problem (discussed in the "Reducibility Among Combinatorial Problems" article by Richard M Karp (1972) in Complexity of Computer Computations. Springer), this task can be shown to be NP-Hard. However, a solution can be approximated using a greedy algorithm, but this approximation is not a p-approximation for any ρ, because of some extreme cases; however, empirically this method provides satisfactory results.

As shown in FIG. 6, the selection process 410 may first pick the snippet with the best score and add it to the solution set. The method then removes samples it matches from the dataset and update the score of the remaining snippets, and repeat. Removing matched samples from the dataset at every step allows the method to pick new snippets that are most characteristic of the remaining samples, and avoids selecting multiple snippets that cover similar characteristics.

This process 420 terminates when every sample of every class has been covered. At this point, the method results in an ordered set of samples $S_i$ and $F_i = \{S_j\}_{j \leq i}$ is the cumulative feature sets. Each of these feature sets has an associated false positive rate $FP_i$, the percentage of samples matched by at least one snippet $F_i$ outside their class; and a true positive rate $TP_i^c$, the percentage of samples of class c matched by at least one of the snippets of their class in $F_i$. By construction, both increase with i and a ROC curve may be constructed and pick the most desired feature set $F_i$.

FIG. 6 shows the pseudocode for the selection process in which, to account for previously matched samples, the process 420 uses a mask that tracks the set of samples matched by the current selection of snippets. During each iteration, the method updates snippet scores by removing samples in the mask from match sets. The method then select the highest-scoring snippet using the "best_snippet" function. Finally, the method appends this snippet to the selection, and add its matches to the mask. The selection process 420 results in the feature set 422.

Returning to FIG. 4, the method 400 may now use the selected snippets generated during the selection process 420 (the feature set 422 that is a set of characteristic snippets for each class of application protocols) to train a classifier (424) to automate the classification. In one embodiment, a Naive Bayes classifier may be trained using the selected set and more preferably a known Bernoulli Naive Bayes model may be used since it is easy to train and used and suitable to the problem since each characteristic snippet is representative of some particular behavior. The presence of a snippet in an SOL is an indicator of a given class; thus, the method can associate with each snippet the conditional probabilities of each class, which is what the Naive Bayes model does while training.

The independence assumption between features also in general fits: the method has chosen characteristic snippets as good discriminators by themselves, not in conjunction with others. The method also already transformed any effective conjunctions into a single snippet in the Aggregation process 416 described above.

FIG. 7 is a table that shows each of the parameters of an embodiment of the method 400 shown in FIG. 4. The information gain threshold and snipper similarity parameters were described above. The parameters also include snippet cutoff and minimum true positive rate parameters used for the filtering and selection processes as shown in FIG. 7. In some cases, the number of filtered snippets might still be high, due to large and diverse datasets. However, the method cannot we do not want keep all candidates, as many will only apply to a negligible fraction of the samples, which tend not to be representative of the characteristic behavior of the application. Using such snippets in the feature set might lead to classifiers that overfit. The method reduces computation time and avoids this issue by reducing the number of filtered snippets, and only keeping those with a large enough true positive rate. In practice, the method kept the 2,500 highest-scoring snippets per class as shown in FIG. 7 and only considered snippets that match at least 0.1% of the samples of their class.

A false positive threshold is shown in FIG. 7 and, depending on the problem being addressed by the method, the false positive requirement can vary. In some cases, the method can have some classification mistakes, if it allows the method to always be able to make some prediction. In other instances, one might require very low false positives, even if it means missing some instances of a given class. To accommodate both situations, the method employs a user-defined false positive threshold, stopping the feature selection process upon reaching that threshold. In our examples, we used a threshold value of 1%.

FIG. 8 illustrates a method 800 for traffic classification using the generated traffic classifiers and the snippets in which a snippet matches a sample when the string is present in that sample's SOL at the position indicated by the anchor (negation flag not set); or the sample does not contain such a string (negation flag set). The method 800 may be performed by the system in FIG. 1, by the sensor appliance 102 in FIG. 1 or by any other system that can perform the method disclosed above to generate the snippets and feature set, train one or more classifiers and perform the traffic classification process. In the traffic classification process 800, one or more on-the-fly classifiers are generated (802) using the snippets. This generating process 802 may include the processes shown above in FIG. 4. As a result of this process, one or more trained classifiers can detect one or more different application protocols without processing/analyzing the payload thus allowing the method to be used on encrypted traffic. The method may then receive network data streams (804) that may or may not include encrypted data traffic. The method, for each network data stream using the one or more trained classifiers, determine one or more application protocols present in the receive data stream using the classifiers (806).

The above system and method was evaluated against public data used in previous classification work including: 1) a 90-minute, 1.7 TB full-payload trace of TCP traffic captured from a medium-sized enterprise network; 2) another 60-minute, 550 GB full-payload trace of UDP traffic captured at the same site; 3) 2 months of DNS-over-HTTPS (DoH) Zeek logs collected from a large university campus; and 4) over 20 hours of full-payload traces of MS-RDPBCGR sessions transported over TLS, about 24 GB from a medium-sized enterprise network. On the public dataset, which contains 5 classes of TCP applications, the system and method disclosed above achieves an overall accuracy of 98.6%, compared to 86.5% reported using the known systems. On the TCP enterprise trace, the disclosed system and method achieved a 96.5% accuracy, with 99.1% accuracy on a subset of 13 of the 17 classes of applications in the trace (F1=0.969). On the UDP trace, the system and method achieved 98.0% accuracy, with an F1 score of 0.980. On the Zeek logs, the system and method distinguished DoH from other TLS traffic, achieved 97.3% accuracy keeping the false positive ratio at 0.06% (F1=0.974). Finally, on RDP data, the system and method distinguishes between password authentication, Kerberos authentication, and other mechanisms, with an accuracy of 99.6% (F1=0.996). These results come from fully automated operation, with no manual tuning or feature engineering required. Detailed examples of the data sets and the traffic classification results achieved using the above method for different application protocols are found in Appendix A that is incorporated herein by reference.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations.

Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A computer implemented method for traffic classifications, comprising:
   providing a plurality of trained traffic classifiers, each trained traffic classifier being trained by using labeled data so that each trained classifier identifies the particular application protocol in a network traffic data stream based on one or more snippets contained in the network traffic data stream, wherein each snippet further comprises a sequence of lengths (SOL) field, an anchor field and a negation field that identify the particular application protocol;
   receiving network traffic data; and
   identifying each application protocol data in the network traffic data using the plurality of trained traffic classifiers.

2. The method of claim 1, wherein the SOL field contains a sequence of data unit lengths and directions, the anchor field contains a position in the network traffic flow sequence of lengths, and the negation field contains a Boolean flag.

3. The method of claim 1, wherein each snippet further comprises a conjunction snippet having two or more snippets.

4. The method of claim 1, wherein each trained traffic classifier is a Naive Bayes classifier for each particular application protocol trained with the one or more snippets representative of the particular application protocol.

5. The method of claim 4, wherein each snippet further comprises a sequence of lengths (SOL) field, an anchor field and a negation field that identify the particular application protocol.

6. The method of claim 5, wherein the SOL field contains a sequence of data unit lengths and direction, the anchor field contains a position in the network traffic data of the sequence and the negation field contains a Boolean flag.

7. The method of claim 4, wherein each snippet further comprises a conjunction snippet having two or more snippets.

8. The method of claim 4, wherein the plurality of application protocols further comprises a secure shell protocol, a secure simple mail transfer protocol, a simple mail transfer protocol and a Kerberos over transmission control protocol.

9. The method of claim 1, wherein providing the trained network classifiers further comprises providing a trained network classifier for each application protocol.

10. The method of claim 1, wherein providing the trained network classifiers further comprises providing a trained network classifier for each application protocol and providing a baseline classifier.

11. An apparatus for traffic classification, the apparatus comprising:
a processor that executes a plurality of lines of instructions wherein the processor is configured to:
receive a plurality of trained traffic classifiers, each trained traffic classifier being trained using labeled data so that each trained classifier identifies the particular application protocol in a network traffic data stream based on one or more snippets contained in the network traffic data stream, wherein each snippet further comprises a sequence of lengths (SOL) field, an anchor field and a negation field that identify the particular application protocol;
receive network traffic data; and
identify each application protocol data in the network traffic data using the plurality of trained traffic classifiers.

12. The apparatus of claim 11, wherein the SOL field contains a sequence of data unit lengths and directions, the anchor field contains a position in the network traffic data of the sequence and the negation field contains a Boolean flag.

13. The apparatus of claim 11, wherein each snippet further comprises a conjunction snippet having two or more snippets.

14. The apparatus of claim 11, wherein each trained traffic classifier is a Naive Bayes classifier for each particular application protocol trained with the one or more snippets representative of the particular application protocol.

15. The apparatus of claim 14, wherein each snippet further comprises a sequence of lengths (SOL) field, an anchor field and a negation field that identify the particular application protocol.

16. The apparatus of claim 15, wherein the SOL field contains a sequence of data unit lengths and directions, the anchor field contains a position in the network traffic data of the sequence and the negation field contains a Boolean flag.

17. The apparatus of claim 14, wherein each snippet further comprises a conjunction snippet having two or more snippets.

18. The apparatus of claim 14, wherein the plurality of application protocols further comprises a secure shell protocol, a secure simple mail transfer protocol, a simple mail transfer protocol and a Kerberos over transmission control protocol.

\* \* \* \* \*